March 14, 1972   R. J. MORRISSEY ET AL   3,649,472
POROSITY TESTING
Filed Oct. 14, 1968   4 Sheets-Sheet 2
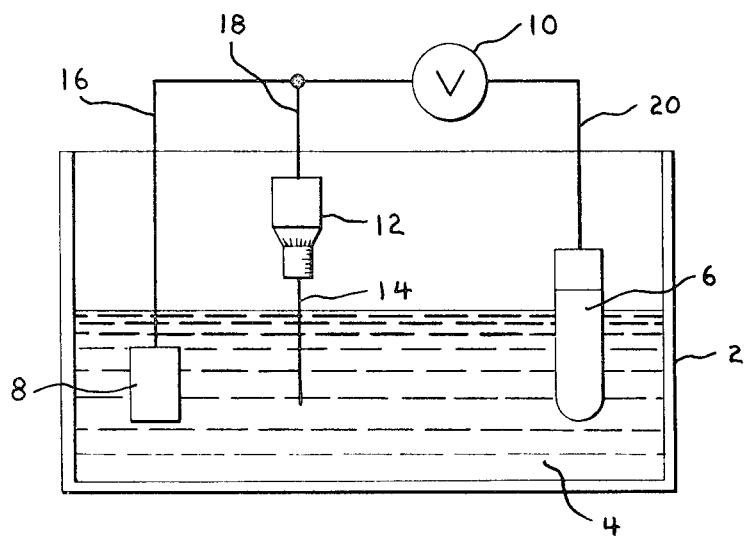
_Fig. 2_
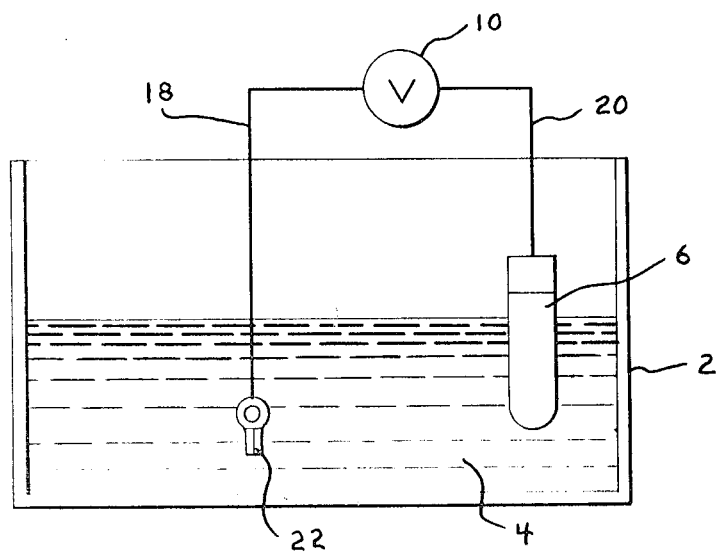
_Fig. 3_

United States Patent Office

3,649,472
Patented Mar. 14, 1972

3,649,472
POROSITY TESTING
Ronald James Morrissey, Harrisburg, and J. A. Crumley, Camp Hill, Pa., assignors to AMP Incorporated, Harrisburg, Pa.
Filed Oct. 14, 1968, Ser. No. 767,231
Int. Cl. G01n 27/00
U.S. Cl. 204—1 T                                            4 Claims

ABSTRACT OF THE DISCLOSURE

Porosity, measured as apparent area fraction of anode, is determined in an electroplated specimen, in which the plating metal is cathodic to the basis metal, by measuring the corrosion potential of the specimen with respect to a suitable reference electrode in an electrolyte which serves as a mild corrodent to the basis metal of the specimen under test. A calibration curve is obtained by measuring, in the same electrolyte and versus the same reference electrode, the corrosion potentials of galvanically connected pure samples of the basis and plating metals, the area relationships of which are known. Corrosion potentials thus obtained for such galvanically connected couples over a predetermined range of area relationships are plotted versus the logarithm of the basis metal (anode) area fraction for each couple to provide a calibration curve, by reference to which the apparent anode area fraction of the test specimen is determined from its observed corrosion potential. If the gross surface area of the test specimen is known, the exposed basis metal area (porosity) can be directly calculated.

BACKGROUND OF THE INVENTION

The present invention relates to the determination of porosity in a coated specimen and particularly, but not necessarily exclusively, to the determination of porosity in electro-plated parts.

When an article, such as an electrical terminal, is provided with an electro-deposited plating of another metal for decorative or functional purposes, the plating may appear to be continuous and unbroken but in actuality there are usually small pores extending through the plating metal to the basis metal. Only the very largest pores in an electro-deposited plating are visible at even high magnifications, most of the pores being so small that they are below the resolving power of the best optical microscopes. The detection, and the determination of the number, of pores, in a given specimen is therefore extremely difficult. Conventional wet methods of analytical chemistry have been used in the past to determine porosity, for example, by exposing the test specimen to an oxidizing agent which will form a readily identifiable reaction product with the basis metal, but these methods are time-consuming and are usually destructive of the test specimen.

The pores which are to be found in electro-deposited platings are highly undesirable and can have a deleterious effect on the article on which the plating is provided. For example, high quality electrical contact terminals of relatively pure copper or copper alloy are frequently provided with a thin plating of gold, silver, or other corrosion resistant metal having good electrical contact properties. Gold is the preferred metal for plating electrical contact terminals because of its extremely good current carrying ability and additionally because of the fact that, by itself, it is highly resistant to corrosion. If a pore extends through the gold plating to the copper basis metal, however, the stage is set for the establishment of a minute gold-copper electrolytic cell which will be activated by the addition of moisture. In a moist atmosphere, and particularly in the presence of dissolved salts, a copper corrosion product, such as copper oxide or copper carbonate, will be formed which will fill the pore and will form on the surface of the contact thereby interfering with its electrical function.

Some porosity is probably present in all gold platings and a certain amount of porosity in gold platings can be tolerated, even in electrical contact terminals. It would be desirable, however, to be able to determine the extent of the porosity in a specimen, such as an electrical terminal, by means of a rapid non-destructive test which could be carried out at the time the specimen is plated so that if an unusually high incidence of porosity is noted, corrective steps can be taken. Porosity can be controlled by, for example, controlling the current density of the plating bath, by controlling the surface roughness of the basis metal, by the use of addition agents to the plating bath, and by varying the thickness of the plating metal.

It is accordingly an object of the invention to provide an improved method of determining porosity in metallic coatings. A further object is to provide a method of determining porosity in the platings on electro-plated parts where the basis metal is anodic with respect to the plating metal. It is a further object to provide a porosity test for plated articles which can be carried out rapidly and which is non-destructive. It is a further object to provide a porosity test which can be carried out with a minimum of equipment by relatively unskilled personnel.

These and other objects of the invention are achieved in one embodiment of the invention comprising a test for porosity in a gold plating on a copper part such as an electrical terminal. In accordance with this embodiment, the corrosion potentials of galvanically connected pure samples of the plating metal (gold) and the basis metal (copper) are measured in a suitable electrolyte and with respect to a suitable reference electrode over a predetermined range of area relationships of the basis metal with respect to the plating metal. The data thus obtained are plotted to produce a curve of corrosion potentinal versus the logarithm of the basis metal area fraction, said area fraction being defined as $$\frac{\text{(Area of Basis Metal)}}{\text{(Area of Basis Metal)} + \text{(Area of Plating Metal)}}$$

To determine the degree of porosity of a test specimen, the corrosion potential of the specimen is measured in the same electrolyte and versus the same reference electrode, and the apparent basis metal area fraction is determined by recourse to the plotted data. If the gross area of the test specimen is known, the exposed area of basis metal can be directly calculated. It will be appreciated that after the curve of corrosion potential v. log fraction area has been determined for a given couple, subsequent porosity tests for given specimens in which this couple is present, as a basis metal and plating metal, can be carried out rapidly since it is only necessary to determine the corrosion potential of the specimen and then refer to the plotted data for a determination of the area fraction of exposed basis metal in the specimen.

In the drawing:

FIG. 2 is a semi-diagrammatic view of an apparatus used to derive the calibration curve of FIG. 1; and FIG. 3 is a semi-diagrammatic view of an apparatus used to determine porosity in accordance with the invention;

Figure 1:
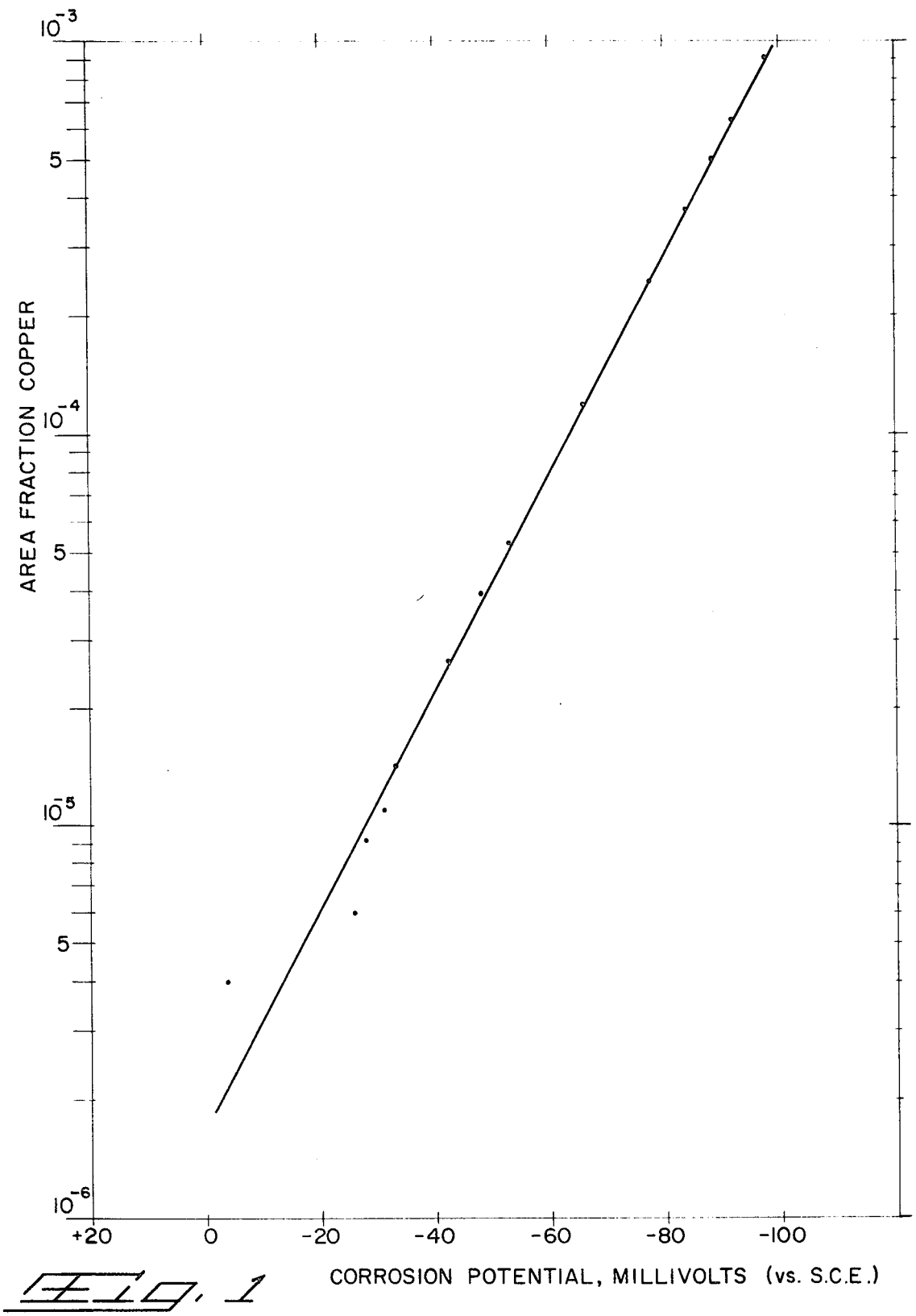
FIG. 1 is a calibration curve used for the determination of porosity in test specimens in accordance with the invention.

It has been shown by Stern [Corrosion, 14, 329t (1958)] that the corrosion potential of a binary galvanic couple is related to the area fractions of the cathode and anode constituents of the couple according to the expression $$\eta_{\text{corr}} = -\frac{E_a\beta_c}{\beta_a+\beta_a} - \frac{\beta_a\beta_c}{\beta_a+\beta_c}\log A_a i_{o_a} + \frac{\beta_a\beta_c}{\beta_a+\beta_c}\log A_c ii_{o_c} \quad (1)$$

where corr is the corrosion potential of the couple, measured with respect to the equilibrium potential of pure cathodic material in the same electrolyte, which, in turn, is measured versus a suitable reference electrode (e.g., a saturated calomel reference electrode). $E_a$ is the corrosion potential of pure anode material in the electrolyte, again measured with respect to the equilibrium potential of pure cathode material in the same electrolyte. $\beta_a$ and $\beta_c$ are the Tafel slopes of the logarithmic polarization curves of pure anodic and cathodic materials, respectively. $A_a$ and $A_c$ are the area fractions of anodic and cathodic materials in the actual couple, and $i_{o_a}$ and $i_{o_c}$ are the exchange current densities for the pure anodic and cathodic materials, respectively. Reference is made to the above identified publication by Stern for details of the mathematical derivation of Expression I.

It has been discovered in this work that the Expression I presented above provides a basis for determining the incidence of porosity in the plating of an electroplated specimen. In reference to Expression I, it may be noted that for a given binary galvanic couple in a given electrolytic bath the electrochemical parameters $E_a$, $\beta_c$ $\beta_a$, $i_{o_a}$, as well as the equilibrium potential of the pure cathodic material, are constants. The Expression I thus reduces to a function of the logarithms of the area fraction $A_c$ and $A_a$.

It may further be noted that the sum of the area fractions $A_c$ and $A_a$ is unity. Thus, if the anodic area fraction $A_a$ is very small (of the order of 0.01 or smaller), the cathodic area fraction $A_c$ approaches unity, and the logarithm of $A_c$ may be considered a constant. Under such conditions, and with suitable substitution and rearrangement in Expression I, it is possible to derive a simplified expression of the form $$v_{\text{corr}} = K_1 = K_2 \text{ long } A_a \quad (II)$$

in which $v_{\text{corr}}$ is the corrosion potential of the test specimen or couple measured with respect to a suitable reference electrode. The contact $K_2$ in Expression II is equal to $[\beta_a\beta_c/(\beta_a+\beta_c)]$, and the constant $K_1$ incorporates the remaining constant terms resulting from the rearrangement of Expression I.

It will be shown in appendices hereto that the relationship of the corrosion potential to the porosity of gold electroplates on copper test specimens may be demonstrated by correlation with the results of other accepted methods of porosity determination; also that the corrosion potential of a copper specimen plated with a porous gold electro-deposit is adequately described by a mathematical expression of the form of Expression II.

As previously noted, electrical terminals of copper or copper alloy are frequently plated with gold or silver to provide a corrosion resistant surface which has good electrical contact characteristics. However, those pores in the plating which extend through to the basis metal constitute minute galvanic couples and the less noble basis metal will be corroded with the result that a corrosion product may be formed in the pores and on the surface of the terminal and interfere with its function. The present method of determining the extent of the porosity in a plated electrical terminal provides a rapid, non-destructive test which can be performed on terminals at the time of manufacture so that corrective steps can be taken if there are excessive amounts of porosity in a given batch of terminals.

In the general description of a preferred embodiment which follows immediately below, a porosity testing procedure is described for a copper part plated with gold and the method steps are discussed in detail for carrying out this testing procedure. Subsequently, there is presented below a discussion of some alternative embodiments of the invention and some specific examples of alternative testing procedures.

In FIG. 1 there is shown a calibration curve in which copper area fraction is plotted against corrosion potential for a copper-gold couple in which the area of the gold is constant and vastly greater than the copper area. The apparatus, FIG. 2, for obtaining the data for the curve of FIG. 1 comprises a suitable glass vessel 2 which is partially filled with an electrolyte 4 of such as a 0.1 M solution of $NH_4Cl$. A standard reference electrode 6, such as a calomel electrode, is immersed in the electrolyte along with a panel 8 of high purity gold having a substantial surface area, and a copper wire 14. Suitable instrumentation 10 is provided to measure the potential between the standard cell 6 and the copper-gold couple comprising the panel 8 and wire 14, the necessary electrical connections for the instrumentation being effected by leads 16, 18, 20. Wire 14 is mounted on a micrometer device 12 so that it can be immersed to varying depths thereby to vary the area of copper (anode area) of the gold-copper cell over a wide range. The data of FIG. 1 extend over a range of copper area fractions from $10^{-3}$ to $4\times10^{-6}$. These data were obtained using a 99.99% pure copper wire of No. 47 gauge size coupled to a 99.9% pure gold panel of 10.8 cm.$^2$ gross geometric surface area. The range area fractions available for calibration can be considerably extended by using finer copper wire specimens or by increasing the area of the gold panel. This latter alternative offers additional advantages which will be further detailed below.

To obtain the data points for the curve of FIG. 1, the micrometer device 12 is adjusted to the several settings which provide immersed areas of copper wire 14 corresponding to the copper area fractions indicated along the ordinate of FIG. 1. At each such setting the voltage indicated by the meter 10 is allowed to reach a steady value, and this steady value is recorded for each setting. This reading is then the corrosion potential of the couple as measured versus that of the saturated calomel reference electrode 6.

When it is desired to determine the degree of porosity (basis metal area fraction) in a gold-plated copper test specimen 22, the copper wire 14, the micrometer device 12, and the gold panel 8 are removed from the cell. The test specimen 22 is suspended in the electrolyte by means of a pure gold wire 18 which, in turn, is connected to the meter 10. The potential indicated by the meter 10 is allowed to reach a steady value and is recorded. The apparent basis metal area fraction of the test specimen is then determined from the data plotted in FIG. 1. It is thus merely necessary to immerse the test specimen 22 in the electrolyte for a brief period to obtain a reading on the meter 10 which, in turn, is directly convertible into a figure representing the apparent area fraction of copper in the test specimen which is exposed to the electrolyte. The area fraction of copper is, in turn, determined by the areas of those pores in the gold plating which extend through to the surface of the underlying copper.

By way of example, if the corrosion potential $v_{\text{corr}}$ of a gold-plated copper test specimen is determined to be $-90$ millivolts with respect to a saturated calomel reference electrode in 0.1 M $NH_4Cl$ solution, it can be determined from FIG. 1 that the apparent area is $5.3\times10^{-4}$, or 0.053% of the total specimen area.

Some experimental considerations of the test method will now be discussed. The term "Apparent Basis Metal Area Fraction" is used in connection with this method for two reasons. Firstly, because the area fractions shown along the ordinate of FIG. 1 are calculated from measurements of the immersed geometric areas of the gold panel and copper wire used in obtaining the calibration curve. It is well-known that even highly-polished solid surfaces are not of atomic smoothness, and that, therefore, the true surface area of a solid must differ from the geometrically-calculated area by a factor which is called the roughness factor. No attempt has been made in this work to acalculate the roughness factors of the gold and copper samples. Rather, it has been assumed, for purposes of obtaining the calibration curves, that the roughness factor of the gold panel was constant, and that those of the copper wire samples employed would be constant along their lengths. The straightness of the plots of the type of FIG. 1 obtained would appear to indicate that this is true. Secondly, an error may be introduced if the electrolyte is unable to penetrate very fine or very deep pores. This effect has been the subject of previous studies [Clarke, M., and Britton, J. C., Trans. Inst. Met. Finishing, 37, 110 (1960); Ogburn, F., Ernest, D. W., and Roberts, W. H., Plating, 46, 1052 (1959)] and represents a limitation inherent in any porosity test procedure employing a liquid phase.

It has been found in this work that the corrosion potentials of gold-plated copper test specimens in 0.1 M $NH_4Cl$ and other solutions are affected by the pH of the electrolyte and also by the concentration of copper ions. The effect of bath pH is small, of the order of 10 millivolts per pH unit. Nonetheless, it is well to exercise care in making up the electrolyte, using carefully weighed quantities of reagent grade chemicals and water of the highest available purity. Boiled, demineralized water having a specific resistance of 150,000 ohms or greater has been used in this work, and electrolyte pH is frequently checked. The effect of copper ion concentration on the corrosion potentials of gold-plated copper specimens in 0.1 M $NH_4Cl$ solution has been found to be negligible at cupric ion concentrations of $4\times10^{-6}$ molar or less. At cupric ion concentrations in excess of this level the effect is large, being of the order of 40 millivolts per order of magnitude of cupric ion concentration. This effect is minimized in practice by employing a sizable volume, 500–2000 ml., of electrolyte in the test cell. With a suitable choice of electrolyte, the test method described in this invention is essentially nondestructive. Corrosion rates of gold-plated copper specimens in 0.1 M $NH_4Cl$ solutions are estimated from polarization resistance measurements to be of the order of 1 milliampere per square centimeter of exposed copper. Assuming that the average test specimen had an exposed copper surface area of $10^{-5}$ cm.$^2$ and that each remained in the electrolyte for 30 minutes, simple calculation shows that some 50,000 such specimens would be required to raise the cupric ion concentration of one liter of 0.1 M $NH_4Cl$ from zero to $5\times10^{-6}$ molar. Normally, electrolyte solutions in this work are changed every few days, so as to avoid the effects of pH change and copper ion accumulation.

The data shown in FIG. 1 were obtained using a Beckman No. 39170 saturated calomel reference electrode having a fiber junction. For convenience, this electrode was located in the test cell at a distance of 5 cm. from the test specimen. It had been found by M. Clarke and J. C. Britton [Trans. Inst. Met. Finishing, 36, 58 (1958)] that the position of the reference electrode is of negligible influence in determining the corrosion potentials of specimens coated with porous electrodeposits. Accordingly, the use of a Luggin probe is not required. The E.M.F. of the saturated calomel reference electrode was checked daily against that of a Beckman No. 41236 silver-silver chloride electrode which was reserved as a standard. Potential measurements were accomplished using Keithley Model 600A, 610A, and 610B electrometer voltmeters, all of which employ input impedances of $10^{14}$ ohms or greater. The Model 600A, being battery-powered and thus free of the effects of line voltage fluctuations, is particularly convenient.

It was mentioned previously that the use of a very large gold panel allowed calibration curves to be obtained to very minute values of the basis metal area fraction. If the area of the gold panel employed is very large, say, 50 or 100 times as large as the area of the test specimens to be examined, it is sometimes convenient to allow the gold panel to remain in the electrolyte after the calibration curve has been obtained, and to connect the test specimen in parallel with the gold panel for purposes of obtaining corrosion potentials. In this case, addition of the test specimen to the electrolyte produces only a relatively insignificant change in the total area of gold exposed to the electrolyte, and the calibration curve obtained using the gold panel and basis metal wire can be drawn to a good approximation in the form corrosion potential versus the logarithm of exposed basis metal *area*. This is particularly convenient for inspection purposes when the test specimens are likely to vary somewhat in area (although, in all cases, they are to be small with respect to the gold panel).

It may be noted in FIG. 1 that deviations from linearity occur at very small area fractions of immersed copper. This behavior is characteristic of dipping-wire calibration experiments of the type described, and the deviations are attributed to differential aeration and other effects occurring as the copper wire is withdrawn through the topmost layers of the electrolyte and the electrolyte-air interface. As a practical matter, wires in sizes of No. 47 gauge and smaller are very difficult to handle, particularly with respect to ensuring that the ends exposed to the electrolyte are ground flat so as to provide accurate measurement of the immersed geometric area. It has been found in this work that it is possible to eliminate the deviations from linearity in FIG. 1 by an alternate method of wire preparation wherein the wire sample is metallographically mounted and polished and the sample thus prepared is partially immersed in the electrolyte such that only the polished end of the wire is in contact with the electrolyte. Electrical contact is effected through the unimmersed end of the mounted sample. A series of such mounted and polished samples containing from one to ten wires are prepared, and a calibration curve of the form of FIG. 1 is obtained when the samples thus prepared are partially immersed serially in the electrolyte and connected, each in turn, to the gold panel; corrosion potentials being determined as outlined previously and immersed basis metal areas being calculated from the known cross-sectional areas of the wire specimens. Great care and skill are required in the preparation and polishing of such mounted samples, particularly with regard to preventing any separation of the wires from the mounting material. This frequently occurs during polishing, and when such separated samples are immersed, leakage of electrolyte into the voids thus created can cause large erroneous readings.

The time required after insertion of a test specimen coated with a porous gold electroplate to achieve a steady corrosion potential is found to vary both with the porosity of the electroplate and with the chemical reactivity of the electrolyte employed. In mildly corrosive electrolytes, such as 0.1 M KCl or 0.1 M $NH_4Cl$., equilibration times are of the order of 10–30 minutes, being greatest for speciments of lowest electroplate porosity. Use of a more aggressive electrolyte such as a solution of (0.1 N $H_2SO_4$+0.1 N NaCl) reduces equilibration times to 1–3 minutes. Prolonged immersion in this latter electrolyte is deleterious to the test specimens and should ordinarily be avoided.

The porosity testing technique of the instant invention is theoretically applicable to a wide variety of basis metal and plating metal combinations so long as the plating metal is cathodic with respect to the basis so that corrosion will take place at the inner ends of the pores. It follows that the plating technique of the instant invention can be applied as a practical matter, to many combinations of plating metal and basis metal if the conditions under which the test is performed are carefully selected. For example, while 0.1 M NH₄Cl solution has been found to be eminently suitable for gold over copper specimens, a wide variety of other electrolytes have been tested and have been found to be satisfactory. Some of these electrolytes will, of course, be preferable for other basis metal-plating metal combinations and would be used for such other combinations. It is only necessary that the electrolyte be capable of corroding the basis metal, that it should not corrode the plating metal, that it should be stable both as to composition and as to pH, and that it have reasonably good conductivity.

A unique advantage of the porosity testing technique of the instant invention is that, as may be observed from FIG. 1, the sensitivity, measured as the change in corrosion potential per change in apparent basis metal area fraction, increases as the apparent basis metal area fraction decreases. For test specimens coated with gold electroplates of very low porosity, it would appear that the test method of the instant invention represents the most sensitive liquid-phase test method yet devised.

The following examples are illustrative of the invention.

EXAMPLE 1

A Pyrex resin kettle of two liters capacity was provided with a Plexiglas cap through which the electrodes could be inserted into the electrolyte. Into this vessel was introduced a volume of 1600 ml., of a solution of 0.1 M NH₄Cl. The specific resistance of this solution was typically 83 ohms, as measured, using a General Radio Model 1650–A impedance bridge. pH was typically 5.1–5.2. Experiments were conducted at room temperature, which varied from 22°–25° C.

1 mm. gold sheet of 99.9% purity obtained from Handy and Harman, Inc., was stamped to form a circular coupon of 25 mm. diameter, having a small punched tab at one edge. This was polished to a bright finish on an abrasive wheel and was used as the gold panel. Its geometric gross surface area was 10.8 cm.$^2$.

Formvar (trademark for polyvinyl formal resins) insulated copper wire in No. 47 gauge size, obtained from Bridgeport Insulated Wire Company, was chemically stripped and cut into short lengths. The cut ends were then ground approximately flat using an abrasive wheel. Spectrogaphich analysis indicated that these specimens were of 99.99% purity.

The experimental procedure was as follows: The Keithley Model 600A electrometer voltmeter was allowed to warm up for one hour. During this time, the gold panel was cleaned by rinsing with acetone, followed by soaking for 30 minutes in 1.0 M HCl. The copper wire specimen was rinsed in acetone, then soaked for 30 minutes in 1.0 M NH₄Cl. Following this treatment, the specimens were rinsed in demineralized water and dried.

When the electrometer voltmeter had warmed up sufficiently to insure a stable zero setting, the E.M.F. of the saturated calomel electrode was checked against that of a silver-silver chloride electrode (Beckman No. 41236) which was reserved as a standard. The gold panel was then immersed into the electrolyte, suspended by means of a 99.99% pure gold wire obtained from the Sigmund Cohn Corporation. The potential of the gold panel was monitored versus S.C.E. until a steady corrosion potential was achieved. Typically, this value was +.200 to +.210 volt in 0.1 M NH₄Cl solution. A strip-chart recorder was connected to the electrometer output so that slow changes in the observed E.M.F. could easily be discerned.

The copper specimen, after cleaning and drying, was inserted at one end into an adapter affixed to the shaft of a calibrated micrometer head. Electrical contact to the copper wire was maintained through the micrometer barrel. The micrometer assembly, with the attached copper wire, was inserted into the reaction vessel cap. A lead was connected from the micrometer to the electrometer input, to which a similar lead from the gold panel had already been connected. The copper wire was then immersed in the bath to the limit of calibrated traverse afforded by the micrometer. The potential of the gold-copper couple versus the potential of standard calomel electrode (S.C.E.) was then monitored until it reached a steady value. The steady-state corrosion potential and the micrometer setting were noted. The copper specimen was then withdrawn slightly, and the steady-state corrosion potential and the micrometer setting were again noted. This step was repeated until the copper wire had been withdrawn entirely from the electrolyte. From the micrometer settings, and the known cross-sectional parameters of the copper wire, the immersed geometric area of copper at each step could be calculated. The resulting calibration curve of corrosion potential versus the logarithm of immersed copper area fraction is shown in FIG. 1.

For determination of the corrosion potentials of gold-plated copper test ring tongue terminal specimens, the gold panel and copper wire were removed from the electrolyte. The test specimen, after vapor degreasing with trichloroethylene and rinsing with acetone and demineralized water, was immersed in the electrolyte, suspended from a 99.99% pure gold wire. A lead from the test specimen was connected to the input of the electrometer voltmeter and the corrosion potential is monitored versus S.C.E. until a steady value was attained. This value was recorded, and the apparent area fraction of copper was determined by recourse to the calibration curve of FIG. 1.

The corrosion potentials and area fractions of basis metal for four specimens were determined to be as follows:

| Specimen | Corrosion potential versus S.C.E, volts | Apparent area fraction of copper |
|---|---|---|
| a | −0.001 | $1.8 \times 10^{-6}$ |
| b | −0.0105 | $3.3 \times 10^{-6}$ |
| c | 0.000 | $1.7 \times 10^{-6}$ |
| d | +0.005 | $1.25 \times 10^{-6}$ |

EXAMPLE 2

The procedure of Example 1 was followed, except that an electrolyte consisting of 0.1 M KCl solution, was employed. A calibration curve of the form of FIG. 1 was obtained.

EXAMPLE 3

The procedure of Example 1 was followed except that an electrolyte consisting of 0.1% (w./v.) NaKC₄H₄O₆·4H₂O solution was employed. A calibration curve of the form of FIG. 1 was obtained.

EXAMPLE 4

The procedure of Example 1 was followed, except that an electrolyte consisting of a solution which was 0.1 N in both H₂SO₄ and NaCl, was employed. A calibration curve of the form of FIG. 1 was obtained.

The corrosion potentials of a number of ring tongue terminal specimens plated with various thicknesses of gold were determined and the apparent area fraction of basis metal determined from the curve. The values were as follows:

| Specimen | Plating thickness | Corrosion potential versus S.C.E., volts | Apparent copper area fraction |
|---|---|---|---|
| a | $30 \times 10^{-6}$ | +0.052 | $1.48 \times 10^{-6}$ |
| b | $30 \times 10^{-6}$ | +0.036 | $3.43 \times 10^{-6}$ |
| c | $30 \times 10^{-6}$ | +0.045 | $2.13 \times 10^{-6}$ |
| d | $60 \times 10^{-6}$ | +0.073 | $5.18 \times 10^{-7}$ |
| e | $90 \times 10^{-6}$ | +0.075 | $4.62 \times 10^{-7}$ |

EXAMPLE 5

The procedure of Example 4 was followed except that a wire sample of 99.98% pure nickel was employed for calibration. The calibration curve obtained, plotted as corrosion potential versus the logarithm of immersed area fraction of nickel, was of the form of that shown in FIG. 1.

The corrosion potentials of a number of copper ring tongue terminal specimens plated with $50 \times 10^{-6}$ inches of nickel and overplated with $30 \times 10^{-6}$ inches of gold were determined and the apparent area fraction of exposed nickel was determined from the curve. The values were as follows.

| Specimen | Corrosion potential versus S.C.E., volts | Apparent area fraction of nickel |
|---|---|---|
| a | −0.010 | $1.94 \times 10^{-5}$ |
| b | −0.015 | $2.31 \times 10^{-5}$ |
| c | +0.015 | $6.94 \times 10^{-4}$ |

EXAMPLE 6

The procedure of Example 5 was followed except that, in place of the 10.8 cm.$^2$ gold panel, a larger panel of 102.1 cm.$^2$ gross geometric surface area was employed. The calibration curve obtained, plotted as in Example 5, was of the form of that shown in FIG. 1.

EXAMPLE 7

The procedure of Example 6 was followed, except that, in place of the dipping wire employed for calibration, metallographically mounted and polished samples were made up incorporating from one to ten 0.001 inch diameter nickel wires. These samples were partially immersed in the electrolyte and connected, each in turn, to the electrometer voltmeter, together with the gold panel for purposes of obtaining corrosion potentials as measured versus the saturated calomel reference electrode. The calibration curve obtained, plotted as in Example 5, was of the form of that shown in FIG. 1.

EXAMPLE 8

Figure 4:
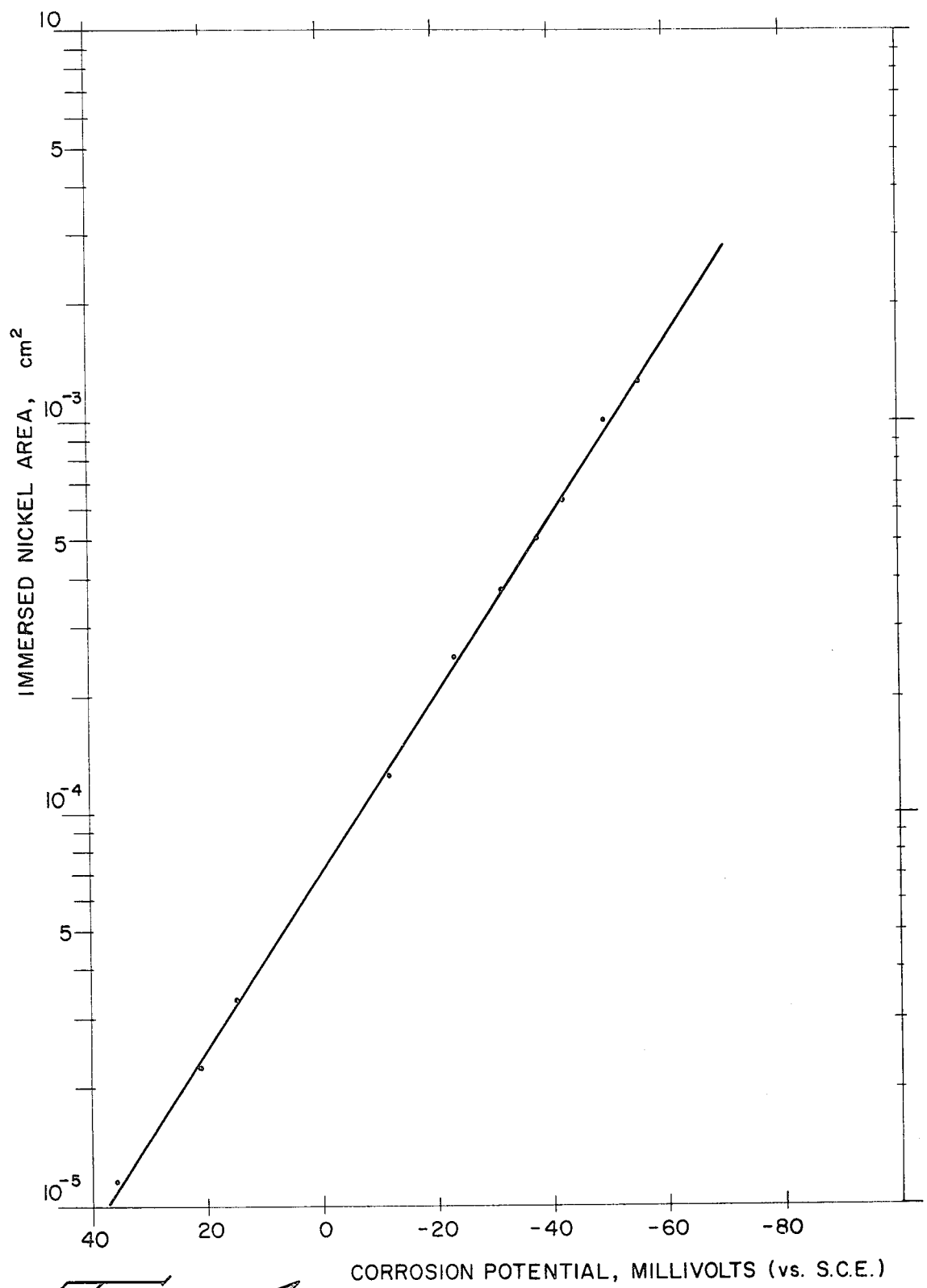
FIGS. 4 and 5 are calibration curves for other embodiments of the invention.

The procedure of Example 7 was followed except that the calibration curve obtained was plotted in the form corrosion potential versus the logarithm of immersed nickel area, as shown in FIG. 4. The corrosion potentials of small test specimens of 2–5 cm.$^2$ gross geometric surface area were determined, as previously outlined, and the apparent exposed nickel area of each is determined by recourse to FIG. 4.

APPENDIX A

Experimental correlation of electroplate porosity determinations by the corrosion potential technique with porosity determinations by the ammonium persulfate-ammonium hydroxide etch technique Experiments were conducted using electroplated specimens to obtain comparative indications of porosity using the corrosion potential technique and also the ammonium persulfate-ammonium hydroxide etch technique described by M. S. Frant [J. Electrochem. Soc., 108, 774 (1961)]. The specimens for these experiments were OFHC copper coupons of 10.8 cm.$^2$ gross geometric surface area, which had been overplate with 100 micro-inch thick deposits of Temperex HD (Sel-Rex Corp.) gold. Temperex HD is an unbrightened gold which deposits at densities approaching the bulk density of pure gold.

The corrosion potentials of the test specimens were determined versus S.C.E. in 0.1 M KCl solution. The test specimens were then individually subjected to etching in 5 ml., each of a solution consisting of equal parts of concentrated NH$_4$OH and 0.1 (NH$_4$)$_2$S$_2$O$_8$. To increase the sensitivity of this technique and to avoid undermining of the gold platings by the very aggressive etchant, etching times were restricted to five minutes per test specimen, and concentrations of copper ion in the resulting solutions were determined by emission spectrography using a rotating-disc technique with radio-frequency spark excitation.

Figure 5:
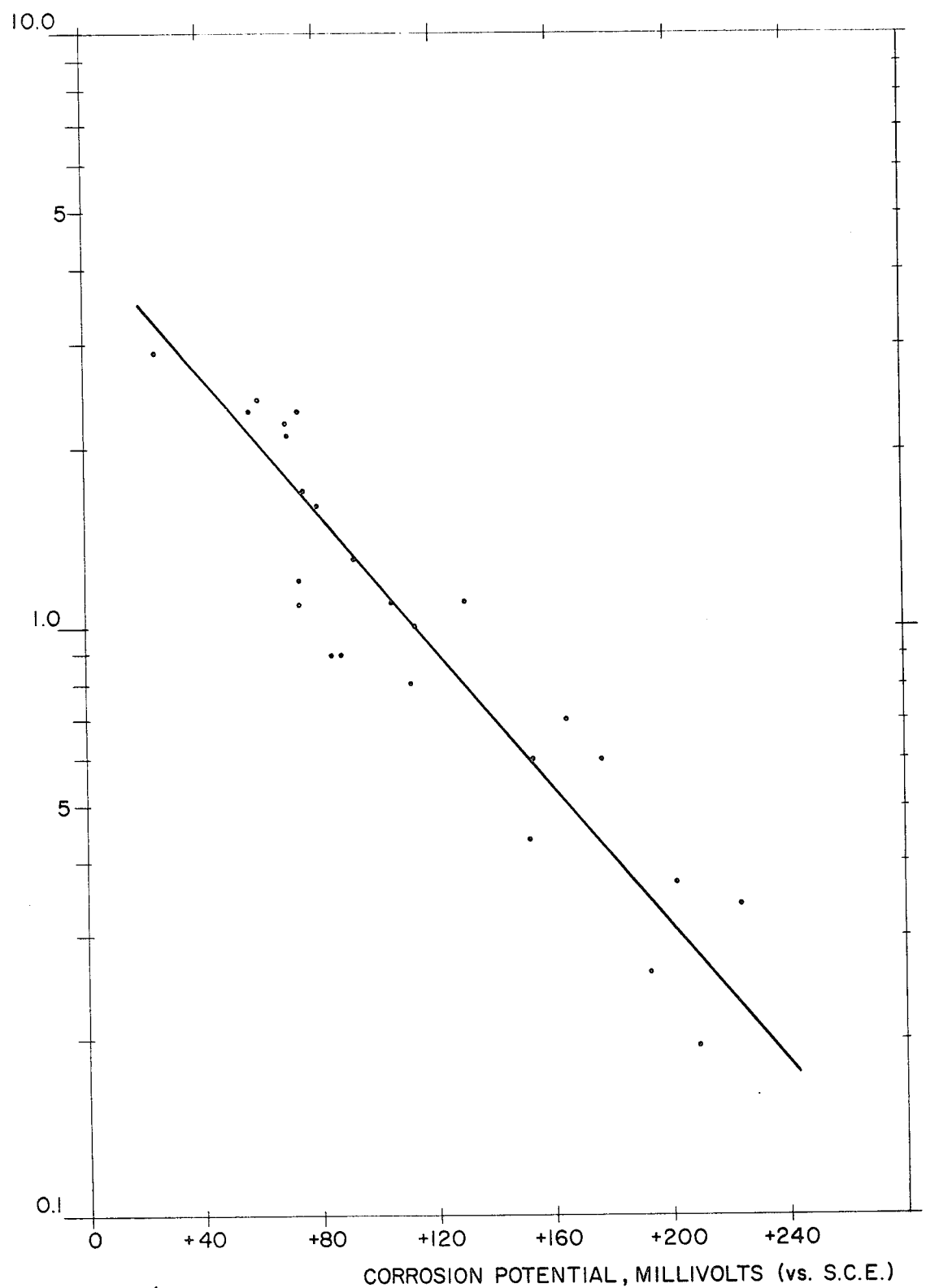

The results of these experiments are shown in FIG. 5. Correlation of the results of the two techniques is within the limits of experimental error of the emission spectrographic technique, as established, using standard CuSO$_4$ solutions at concentrations 1.0 and 10.0 micrograms per milliliter.

APPENDIX B

Experimental verification of corrosion potential change with change of apparent copper area fraction in gold-plated copper test specimens Experiments were conducted using gold-electroplated test specimens to determine the change in corrosion potential occurring when the apparent copper area fraction of the test specimen is changed by electrically coupling the specimen to a large panel of pure gold in the same electrolyte and then decoupling; the steady-state corrosion potentials being recorded in each case.

The electrolyte used in these experiments were 0.1 M NH$_4$Cl. The test specimens consisted of small copper electrical terminals of geometric gross surface area 2.5 cm.$^2$. These were plated with Temperex HD gold in thickness of 100, 200, and 400 micro-inches. In addition, OFHC copper coupons of 10.2 cm.$^2$ geometric gross surface area were employed. These were plated with Temperex HD gold to a thickness of 50 micro-inches. A 99.9% gold panel of 102.1 cm.$^2$ geometric gross surface area was employed. This panel was, in turn, overplated with Temperex HD gold of 200 micro-inches thickness to give it a smooth matte surface finish similar to that of the plated test specimens.

The gold panel was cleaned, as previously outlined, and immersed in the electrolyte, suspended by a 99.99% gold wire. The corrosion potential of the panel was then monitored versus S.C.E. until a steady corrosion potential, typically +0.210 volt, was obtained. The test specimen, after rinsing in acetone, was suspended in the electrolyte by means of a 99.99% gold wire, and a lead from the specimen was connected to the input lead of the electrometer voltmeter, to which a similar lead from the gold panel had already been connected. The corrosion potential of the coupled pair was then monitored versus S.C.E. until a steady corrosion potential was established. This value was then recorded, after which the lead from the gold panel was disconnected. The corrosion potential of the new decoupled test specimen was again monitored versus S.C.E. until a steady value was attained, and this value was again recorded. This procedure was repeated for several test specimens, with results as follows:

| Specimen area, cm.$^2$ | Gold thickness, μ | $V_{corr.}$ coupled | $V_{corr.}$ uncoupled | Δ $V_{corr.}$ |
|---|---|---|---|---|
| 2.5 | 400 | +.177 | +.122 | .055 |
| 2.5 | 400 | +.163 | +.104 | .059 |
| 2.5 | 200 | +.124 | +.060 | .064 |
| 2.5 | 200 | +.115 | +.055 | .060 |
| 2.5 | 100 | +.092 | +.039 | .053 |
| 2.5 | 100 | +.117 | +.063 | .054 |
| 2.5 | 100 | +.095 | +.036 | .059 |
| 10.2 | 50 | +.125 | +.084 | .041 |
| 10.2 | 50 | +.123 | +.084 | .039 |

It can be calculated that the change in total gold area effected when a 2.5 cm.$^2$ test specimen is coupled to the 102.1 cm.$^2$ gold panel is by a factor of approximately 42. For the 10.2 cm.$^2$ test specimens, the change is approximately by a factor of 11. There is no change in the area of copper exposed to the electrolyte; thus the changes in apparent copper area fraction are also by factors of 42 and 11, respectively. From the data presented in FIG. 1, it can be seen that a change in apparent copper area fraction by a factor of 42 corresponds to a corrosion potential change of 59 millivolts. The experimentally observed changes for the coupled and decoupled test specimens are all equal to, or close to, this value. Similarly, the change in corrosion potential corresponding to a change in apparent copper area fraction by a factor of 11 is determined from FIG. 1 to be 39 millivolts. Again, the agreement to this value observed for the coupled and decoupled test specimens is excellent. It is felt that this evidence strongly supports the validity of an expression of the form of Expression II for describing the corrosion potentials of base metal specimens covered with porous gold electro-deposits.

Changes in construction will occur to those skilled in the art and various apparently different modifications and embodiments may be made without departing from the scope of the invention. The matter set forth in the foregoing description and accompanying drawings is offered by way of illustration only.

What is claimed is:

1. A method of determining the porosity in a plated specimen, said specimen comprising a basis metal and a plating metal, said plating metal being cathodic to said basis metal, said method comprising the steps of:
    determining the corrosion potential of a couple comprising said basis metal and said plating metal in an electrolyte as measured against the potential of a standard reference electrode, the determinations being made over a range of area relationships such that the area fraction of basis metal to plating metal is no greater than $10^{-3}$,
    plotting the data obtained as a linear calibration curve of log area fraction of basis metal versus corrosion potential for said range of area relationships,
    connecting a ballast electrode of said plating metal in parallel with said plated specimen and measuring the corrosion potential of said plated specimen against the potential of said standard reference electrode in said electrolyte, and
    determining from said calibration curve the apparent basis metal area fraction of said plated specimen.

2. A method as set forth in claim 1 wherein said basis metal comprises a cupreous metal.

3. A method as set forth in claim 1 wherein said basis metal comprises a cupreous metal and said plating metal comprises gold.

4. A method as set forth in claim 1 wherein said basis metal comprises nickel and said plating metal comprises gold.

References Cited

UNITED STATES PATENTS 3,479,256  11/1969  Smith et al. _____ 204—1

OTHER REFERENCES

G. G. Kamm et al.: Corrosion, vol. 17, pp. 84t–92t (1961).

S. C. Shome et al.: Journal of the Electro Depositors' Tech. Soc., vol 27, pp. 65–74 (1951).

M. Clarke et al.: Trans. Inst. Met. Finishing, 36, 58 (1958).

F. Ogburn et al.: Plating, 46, 1052 (1959).

M. Clarke et al.: Trans. Inst. Met. Finishing, 37, 110 (1960).

T. P. Hoar: J. Electrodepositors' Tech. Soc., 14, 42 (1938).

GERALD L. KAPLAN, Primary Examiner

U.S. Cl. X.R.

204—195; 324—29,71 C